(12) United States Patent
Park

(10) Patent No.: US 11,125,148 B2
(45) Date of Patent: Sep. 21, 2021

(54) HYBRID INTERCOOLER SYSTEM INTEGRATED WITH AIR CONDITIONING SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventor: Dang-Hee Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 47 days.

(21) Appl. No.: 16/561,332

(22) Filed: Sep. 5, 2019

(65) Prior Publication Data

US 2019/0390592 A1 Dec. 26, 2019

Related U.S. Application Data

(62) Division of application No. 15/354,583, filed on Nov. 17, 2016, now Pat. No. 10,458,314.

(30) Foreign Application Priority Data

Mar. 3, 2016 (KR) .......................... 10-2016-0025633

(51) Int. Cl.
*B60H 1/00* (2006.01)
*F02B 29/04* (2006.01)
(Continued)

(52) U.S. Cl.
CPC ..... *F02B 29/0443* (2013.01); *B60H 1/00271* (2013.01); *B60H 1/00342* (2013.01);
(Continued)

(58) Field of Classification Search
CPC ............ F02B 29/0443; B60H 1/00271; B60H 1/00342; F25B 2313/0233
See application file for complete search history.

(56) References Cited

U.S. PATENT DOCUMENTS 6,499,307 B1   12/2002  Peterson et al.
6,748,934 B2 *  6/2004  Natkin ................. F25B 25/005
                                                                      123/563
(Continued)

FOREIGN PATENT DOCUMENTS

JP      S62-153518 A    7/1987
JP      2005-002983 A   1/2005
(Continued)

*Primary Examiner* — Elizabeth J Martin
*Assistant Examiner* — Nael N Babaa

(57) ABSTRACT

A method of controlling a hybrid intercooler system integrated with an air conditioning system includes: starting operation of the air conditioning system by opening first and second air conditioning valves and operating a compressor, when an operation signal of the air conditioning system is determined to be applied; measuring a first temperature by measuring a temperature of compressed air at an outlet of the hybrid intercooler system, after the starting operation of the air conditioning system; and starting operation of a first water cooling unit by opening first and second bypass valves, when the measured first temperature exceeds a predetermined first reference temperature. This method stabilizes the temperature of intake air passing through the inlet of an intercooler using a water cooling unit and increases the cooling efficiency of the intercooler using an air cooling unit.

7 Claims, 7 Drawing Sheets

(51) Int. Cl.
*B60H 1/14* (2006.01)
*B60H 1/32* (2006.01)
*B60H 1/22* (2006.01)

(52) U.S. Cl.
CPC ............ *B60H 1/14* (2013.01); *B60H 1/3211* (2013.01); *F02B 29/0425* (2013.01); *B60H 2001/003* (2013.01); *B60H 2001/00307* (2013.01); *B60H 2001/2253* (2013.01); *B60H 2001/3255* (2013.01); *Y02T 10/12* (2013.01)

(56) References Cited

U.S. PATENT DOCUMENTS

| | | | |
|---|---|---|---|
| 7,337,769 | B2 | 3/2008 | Yi |
| 2013/0000612 | A1 | 1/2013 | Vigild et al. |
| 2015/0128628 | A1* | 5/2015 | Kawagoe ................ F25B 49/02 62/160 |
| 2015/0159923 | A1 | 6/2015 | Akisawa et al. |
| 2015/0168025 | A1 | 6/2015 | Briglia et al. |

FOREIGN PATENT DOCUMENTS

| | | |
|---|---|---|
| JP | 2009-209810 A | 9/2009 |
| JP | 2015-145667 A | 8/2015 |
| KR | 1995-0009398 Y1 | 10/1995 |
| KR | 10-2004-0021935 A | 3/2004 |
| KR | 10-2005-0028106 A | 3/2005 |
| KR | 10-2005-0061230 A | 6/2005 |
| KR | 10-2011-0061216 A | 6/2011 |
| KR | 10-2012-0062095 A | 6/2012 |
| KR | 10-2012-0063108 A | 6/2012 |

* cited by examiner

ND METHOD OF CONTROLLING
HYBRID INTERCOOLER SYSTEM INTEGRATED WITH AIR CONDITIONING SYSTEM AND METHOD OF CONTROLLING THE SAME

CROSS-REFERENCE TO RELATED APPLICATION

This application is a divisional application of non-provisional U.S. patent application Ser. No. 15/354,583, filed on Nov. 17, 2016, which claims the benefit of Korean Patent Application No. 10-2016-0025633, filed on Mar. 3, 2016, the entirety of each of which are incorporated by reference.

FIELD

The present disclosure relate to a hybrid intercooler system integrated with an air conditioning system and a method of controlling the same.

BACKGROUND

The statements in this section merely provide background information related to the present disclosure and may not constitute prior art.

In general, a turbocharger is a supercharging device which increases intake air charging efficiency and increases engine power by compressing intake air supplied to the engine using expulsive power of exhaust gas and supplying the compressed gas to a cylinder.

The turbocharger has a typical structure that includes a compressor and a turbine, which are disposed on the same axis. The turbocharger compresses air introduced through an intake manifold to supply the compressed air to the cylinder by rotating the turbine using expulsive power of exhaust gas discharged through an exhaust pipe and rotating the compressor disposed on the same axis as the turbine.

Meanwhile, the air compressed by the turbocharger has a high temperature. Accordingly, when the compressed air is supplied to a combustion chamber as it is, the rate of increase in air density is reduced, thereby causing deterioration of charging efficiency or knocking. Thus, an intercooler is provided in order to lower the temperature of supercharged air. FIG. 1 is a view for explaining a conventional intercooler. Referring to FIG. 1, intake air cooled while passing through the intercooler has a high density and a low temperature, and thus combustion performance is improved.

Intercoolers are typically classified into an air-cooled intercooler and a water-cooled intercooler according to cooling methods. The air-cooled intercooler is a device which is cooled by cold air passing through cooling pins formed integrally with a plurality of tubes while supercharged air passes through the tubes. On the other hand, the water-cooled intercooler is a device which is cooled by water and has a cooling passage coming into contact with a plurality of tubes.

SUMMARY

The present disclosure provides a hybrid intercooler system integrated with an air conditioning system and a method of controlling the same, which are capable of improving the cooling efficiency of an intercooler by integrating an air-cooled intercooler with a water-cooled intercooler, and cooling the water-cooled intercooler using an air conditioning system without a separate cooling line.

In accordance with one form of the present disclosure, a hybrid intercooler system integrated with an air conditioning system includes: an air cooling unit (100) to exchange heat between outside air passing through outer walls of a plurality of compressed intake air passages (110) and compressed intake air flowing in the compressed intake air passages (110) so as to cool the compressed intake air, and a water cooling unit (200) to exchange heat between a water-cooling-unit refrigerant surrounding the outer walls of the compressed intake air passages (110) and the compressed intake air cooled by the air cooling unit (100).

The water cooling unit (200) may include a water-cooling-unit refrigerant tank (210) surrounding the compressed intake air passages (110), and a bypass line (220) branched from a receiver drier (310) and communicating with a compressor (320) through the water-cooling-unit refrigerant tank (210). The hybrid intercooler system may include a first bypass valve (331) and a second bypass valve (332) mounted on the bypass line (220) at the respective upstream and downstream of the water-cooling-unit refrigerant tank (210), so as to open or close the bypass line (220).

The hybrid intercooler system may further include an expansion line (230) allowing the receiver drier (310) to communicate with an expansion valve (360), an evaporation line (240) allows the expansion valve (360) to communicate with a heating core (370), a first air conditioning valve (333) mounted on the expansion line (230) to open or close the expansion line (230), a compression line (250) allowing the heating core (370) to communicate with the compressor (320), a second air conditioning valve (334) mounted on the compression line (250) to open or close the compression line (250), a condensation line (260) allowing the compressor (320) to communicate with an air conditioning condenser (340), and a gas-liquid separation line (270) allowing the air conditioning condenser (340) to communicate with the receiver drier (310).

The air cooling unit (100) and the water cooling unit (200) may be disposed such that the compressed intake air passes through the air cooling unit (100) and then passes through the water cooling unit (200).

The bypass line (220) may be disposed so as to pass between the compressed intake air passages (110) and an inner wall of the water-cooling-unit refrigerant tank (210).

The bypass line (220) may be divided into a plurality of lines in a section in which the bypass line (220) passes between the compressed intake air passages (110) and the inner wall of the water-cooling-unit refrigerant tank (210).

The water-cooling-unit refrigerant tank (210) may include a water-cooling-unit refrigerant injection port (211) protruding from an upper surface thereof, and a water-cooling-unit refrigerant cap (212) to open or close the water-cooling-unit refrigerant injection port (211).

In accordance with another form of the present disclosure, a method of controlling a hybrid intercooler system integrated with an air conditioning system includes: determining whether or not an operation signal of an air conditioning system is applied (S100), starting operation of the air conditioning system (S200) by opening first and second air conditioning valves (333 and 334) and operating a compressor (320) when the operation signal of the air conditioning system is determined to be applied, measuring a first temperature (S300) by measuring a temperature of compressed air at an outlet of the hybrid intercooler system integrated with the air conditioning system after the starting operation of the air conditioning system (S200), determining whether the measured first temperature exceeds a predetermined first reference temperature, and starting operation of a first water cooling unit (S500) by opening first and second bypass valves (331 and 332) when the measured first temperature exceeds the predetermined first reference temperature.

The method may further include stopping the operation of the first water cooling unit (S600) by closing at least one of the first or second bypass valves (331 and 332), when the measured first temperature is determined to be equal to or less than the predetermined first reference temperature.

The method may further include stopping the operation of the air conditioning system (S700) by closing the first and second air conditioning valves (333 and 334) and stopping the operation of the compressor (320), when the operation signal of the air conditioning system is determined to be not applied.

The method may further include measuring a second temperature (S800) by measuring a temperature of compressed air at the outlet of the hybrid intercooler system integrated with an air conditioning system, after the stopping the operation of the air conditioning system (S700).

The method may further include determining whether the measured second temperature exceeds a predetermined second reference temperature.

The method may further include starting operation of a second water cooling unit by opening the first and second bypass valves (331 and 332) and operating the compressor (320), when the measured second temperature exceeds the predetermined second reference temperature.

The method may further include stopping operation of a second water cooling unit (S1100) by closing at least one of the first or second bypass valves (331 and 332) and maintaining the stopped operation of the compressor (320), when the measured second temperature is determined to be equal to or less than the predetermined second reference temperature.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
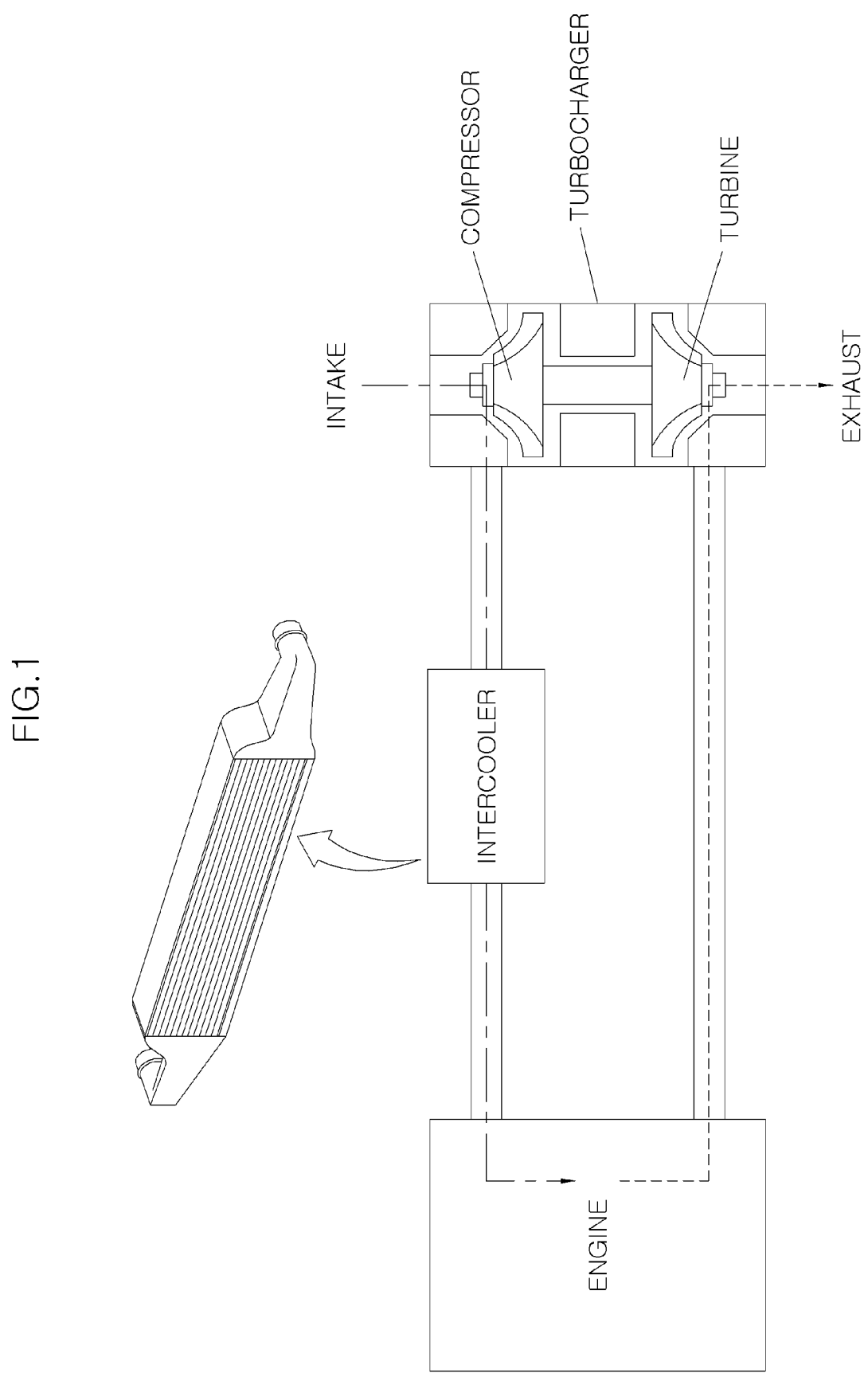
FIG. 1 is a view illustrating a conventional intercooler.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terms and words used in the specification and claims should not be construed as their ordinary or dictionary sense. On the basis of the principle that the inventor can define the appropriate concept of a term in order to describe his/her own present disclosure in the best way, it should be construed as meaning and concepts for complying with the technical idea of the present disclosure. Accordingly, the forms described in the present disclosure and the construction shown in the drawings are nothing but one exemplary form of the present disclosure, and it does not cover all the technical ideas of the present disclosure. Thus, it should be understood that various changes and modifications may be made at the time of filing the present application. In addition, detailed descriptions of functions and constructions well known in the art may be omitted to avoid unnecessarily obscuring the gist of the present disclosure.

Figure 2:
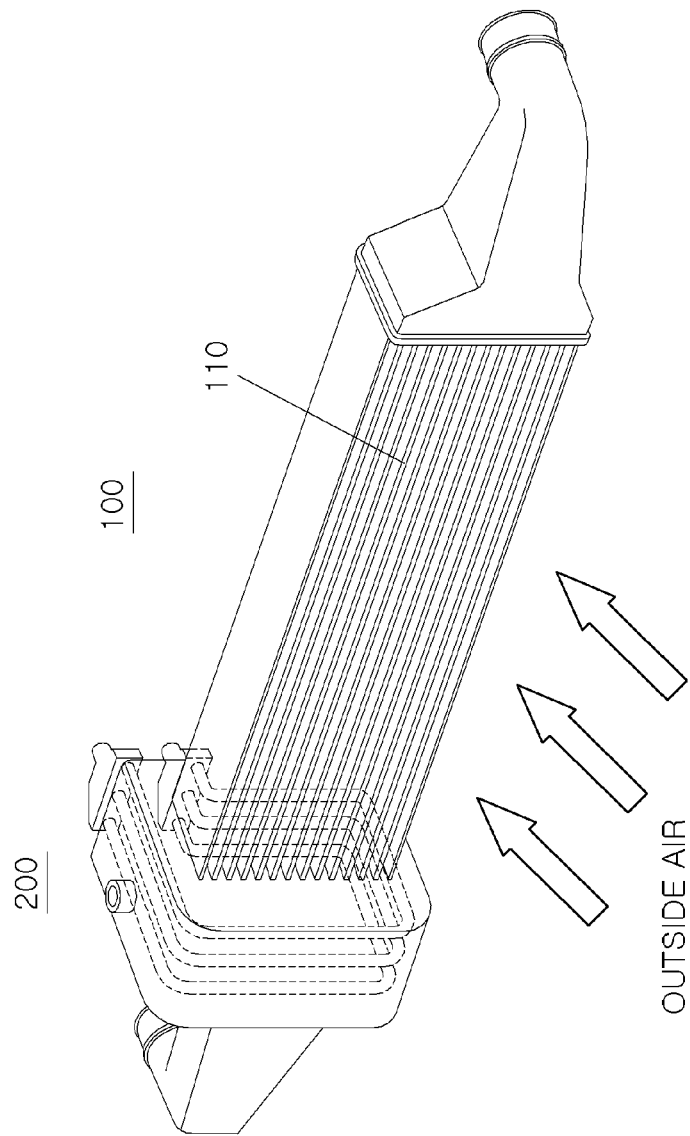
FIG. 2 is a partial perspective view illustrating a hybrid intercooler system integrated with an air conditioning system according to one form of the present disclosure.
Figure 3:
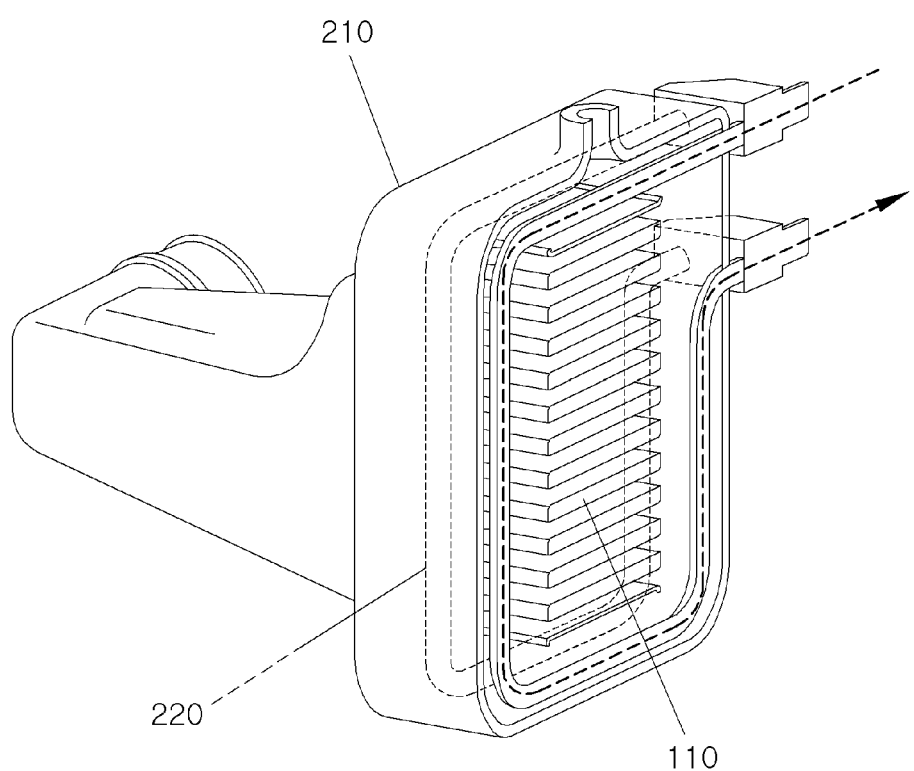
FIG. 3 is a cross-sectional perspective view illustrating a water cooling unit in the hybrid intercooler system integrated with an air conditioning system according to the present disclosure.
Figure 4:
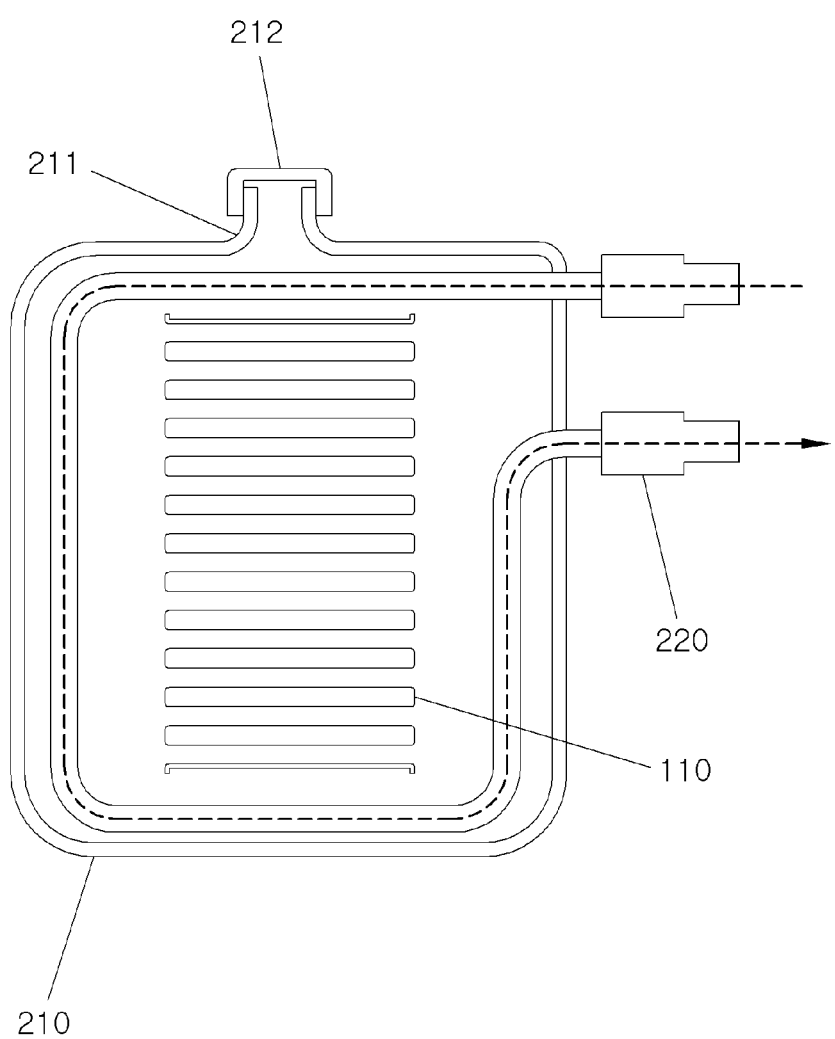
FIG. 4 is a cross-sectional view illustrating the water cooling unit in the hybrid intercooler system integrated with an air conditioning system according to the present disclosure.
Figure 5:
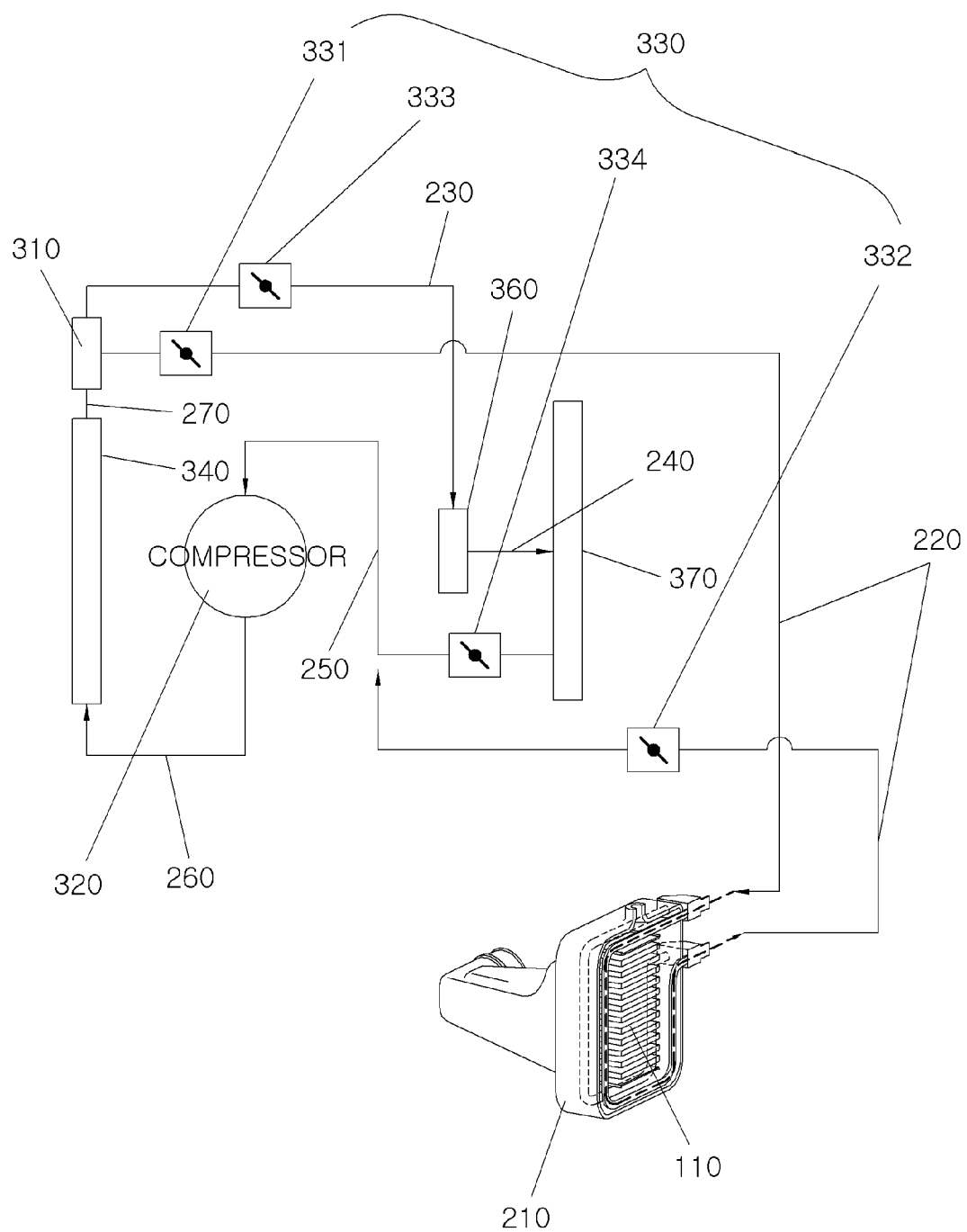
FIG. 5 is a block diagram illustrating the hybrid intercooler system integrated with an air conditioning system according to the present disclosure.

FIG. 2 is a partial perspective view illustrating a hybrid intercooler system integrated with an air conditioning system. FIG. 3 is a cross-sectional perspective view illustrating a water cooling unit in the hybrid intercooler system integrated with an air conditioning system. FIG. 4 is a cross-sectional view illustrating the water cooling unit in the hybrid intercooler system integrated with an air conditioning system. FIG. 5 is a block diagram illustrating the hybrid intercooler system integrated with an air conditioning system. Referring to FIGS. 2 to 5, the hybrid intercooler system includes: an air cooling unit 100 and a water cooling unit 200.

The air cooling unit 100 serves to exchange heat between outside air passing through outer walls of a plurality of compressed intake air passages 110 and compressed intake air flowing in the compressed intake air passages 110 so as to cool the compressed intake air. In addition, the water cooling unit 200 serves to exchange heat between a water-cooling-unit refrigerant surrounding the outer walls of the compressed intake air passages 110 and the compressed intake air cooled by the air cooling unit 100.

In this case, the air cooling unit 100 and the water cooling unit 200 are arranged such that the compressed intake air passes through the air cooling unit 100 and then passes through the water cooling unit 200. Accordingly, high-temperature intake air (compressed intake air) compressed by a turbocharged is primarily cooled while passing through the air cooling unit 100 having high cooling efficiency, and is stably cooled while secondarily passing through the water cooling unit 200.

In particular, the water cooling unit 200 is disposed such that the temperature of compressed intake air, cooled by the air cooling unit 100, is changed from an intermediate temperature to a low temperature. With this arrangement, the hybrid intercooler system cools the compressed intake air from a high temperature to an intermediate temperature by the air cooling unit 100 and to a low temperature by the water cooling unit 200, thereby reducing energy consumption and effectively controlling the temperature of intake air at the outlet of the hybrid intercooler system integrated with an air conditioning system. Hereinafter, the water cooling unit 200 will be described in detail.

The water cooling unit 200 includes a water-cooling-unit refrigerant tank 210 and a bypass line 220. The water-cooling-unit refrigerant tank 210 is disposed so as to surround the compressed intake air passages 110. In addition, the water-cooling-unit refrigerant tank 210 is filled with a water-cooling-unit refrigerant. Various media may be used as the water-cooling-unit refrigerant in consideration of specific heat. In particular, when a medium similar to transmission oil is used as the water-cooling-unit refrigerant, it may be used semipermanently.

The water-cooling-unit refrigerant tank 210 includes a water-cooling-unit refrigerant injection port 211 protruding from the upper surface thereof, and a water-cooling-unit refrigerant cap 212 which opens or closes the water-cooling-unit refrigerant injection port 211. Accordingly, when the water-cooling-unit refrigerant is not a refrigerant which is usable semipermanently, a water-cooling-unit refrigerant may be replenished through the water-cooling-unit refrigerant injection port 211, and the water-cooling-unit refrigerant injection port 211 may be closed by the water-cooling-unit refrigerant cap 212 after replenishment of the refrigerant.

The bypass line 220 is branched from a receiver drier 310, and communicates with a compressor 320 through the water-cooling-unit refrigerant tank 210. In particular, a liquid-phase air conditioning refrigerant discharged from the receiver drier 310 flows in the bypass line 220, and the air conditioning refrigerant is introduced into the compressor 320 through the bypass line 220. In this case, the compressor 320 serves to compress a gas-phase air conditioning refrigerant and discharge a high-pressure and gas-phase air conditioning refrigerant. In addition, an air conditioning condenser 340 serves to condense the high-pressure and gas-phase air conditioning refrigerant discharged from the compressor 320 into a liquid-phase refrigerant. In addition, the receiver drier 310 serves to separate a gas-phase air conditioning refrigerant from the air conditioning refrigerant discharged from the air conditioning condenser 340, and to discharge only a liquid-phase air conditioning refrigerant.

In the bypass line 220, a first bypass valve 331 is mounted on the bypass line 220 at the upstream of the water-cooling-unit refrigerant tank 210, and a second bypass valve 332 is mounted on the bypass line 220 at the downstream of the water-cooling-unit refrigerant tank 210. The first and second bypass valves 331 and 332 may open the bypass line 220 so that the low-temperature and liquid-phase air conditioning refrigerant discharged from the receiver drier 310 is introduced into the bypass line 220. In this case, the compressed intake air, which flows in the compressed intake air passages 110 surrounded by the water cooling unit 200, is cooled.

In addition, the first and second bypass valves 331 and 332 may close the bypass line 220 so that the low-temperature and liquid-phase air conditioning refrigerant discharged from the receiver drier 310 is blocked from being introduced into the bypass line 220. In this case, the compressed intake air, which flows in the compressed intake air passages 110 surrounded by the water cooling unit 200, is not effectively cooled.

The first and second bypass valves 331 and 332 may be selectively opened or closed, or be simultaneously opened or closed.

In addition, the bypass line 220 is disposed so as to pass between the compressed intake air passages 110 and the inner wall of the water-cooling-unit refrigerant tank 210. Accordingly, the water-cooling-unit refrigerant cools the compressed intake air flowing in the compressed intake air passages 110, and the liquid-phase refrigerant in the bypass line 220 cools the water-cooling-unit refrigerant. In this case, the bypass line 220 is divided into a plurality of lines in a section in which it passes between the compressed intake air passages 110 and the inner wall of the water-cooling-unit refrigerant tank 210. This enables the air conditioning refrigerant to be smoothly circulated in the section in which the bypass line 220 passes through the water-cooling-unit refrigerant tank 210.

The water cooling unit 200 includes an expansion line 230, an evaporation line 240, a compression line 250, a condensation line 260, and a gas-liquid separation line 270. The expansion line 230, the evaporation line 240, the compression line 250, the condensation line 260, and the gas-liquid separation line 270 are lines used in the air conditioning system of the vehicle.

The expansion line 230 allows the receiver drier 310 to communicate with an expansion valve 360. Here, the expansion valve 360 serves to expand a high-pressure and liquid-phase air conditioning refrigerant such that the refrigerant is easily evaporated. In addition, the liquid-phase refrigerant condensed by the air conditioning condenser 340 flows in the expansion line 230.

The evaporation line 240 allows the expansion valve 360 to communicate with a heating core 370. Here, the heating core 370 evaporates a liquid-phase refrigerant, and uses a consequent heat absorption reaction to cool outside air in the heating core 370. In this case, the gas-phase refrigerant expanded by the expansion valve 360 flows in the evaporation line 240.

The compression line 250 allows the heating core 370 to communicate with the compressor 320. In this case, the gas-phase refrigerant, which is evaporated by the expansion valve 360 and is heat-exchanged with air in the vehicle by the heating core 370, flows in the compression line 250.

The condensation line 260 allows the compressor 320 to communicate with the air conditioning condenser 340. In this case, the high-pressure and gas-phase refrigerant compressed by the compressor flows in the condensation line 260.

In addition, the gas-liquid separation line 270 allows the air conditioning condenser 340 to communicate with the receiver drier 310. In this case, the liquid-phase air conditioning refrigerant condensed by the air conditioning condenser 340 is mixed with a gas-phase air conditioning refrigerant, which is not condensed, and the mixed refrigerant flows in the gas-liquid separation line 270.

In addition, the hybrid intercooler system includes a first air conditioning valve 333 which is mounted on the expansion line 230 to open or close the expansion line 230, and a second air conditioning valve 334 which is mounted on the compression line 250 to open or close the compression line 250. The first and second air conditioning valves 333 and 334 may be selectively opened or closed, or be simultaneously opened or closed.

The first air conditioning valve 333 may open the expansion line 230 so that the low-temperature and liquid-phase air conditioning refrigerant discharged from the receiver drier 310 is introduced into the expansion valve 360. Thus, the air conditioning refrigerant is changed to a low-temperature and gas-phase air conditioning refrigerant by expansion in the expansion valve 360, and the low-temperature and gas-phase air conditioning refrigerant exchanges heat with air in the vehicle by the heating core 370 to cool the vehicle interior.

The second air conditioning valve 334 may open the compression line 250 so that the gas-phase refrigerant heat-exchanged by the heating core 370 is introduced into the compressor 320. Thus, the heat-exchanged gas-phase refrigerant is compressed so as to be changed to a high-pressure refrigerant by the compressor 320.

On the other hand, the first air conditioning valve 333 may close the expansion line 230 so that the low-temperature and liquid-phase air conditioning refrigerant discharged from the receiver drier 310 is blocked from being introduced into the expansion valve 360. In addition, the second air conditioning valve 334 may close the compression line 250 so that the gas-phase refrigerant heat-exchanged by the heating core 370 is blocked from being introduced into the compressor 320. In particular, when it is unnecessary to cool the vehicle interior, it is possible to inhibit or prevent the cooling of the vehicle interior by closing the first and second air conditioning valves 333 and 334. It is possible to independently operate the air conditioning system or to simultaneously cool the compressed intake air flowing in the compressed intake air passages 110 surrounded by the water cooling unit 200, by opening the first and second air conditioning valves 333 and 334.

Figure 6A:
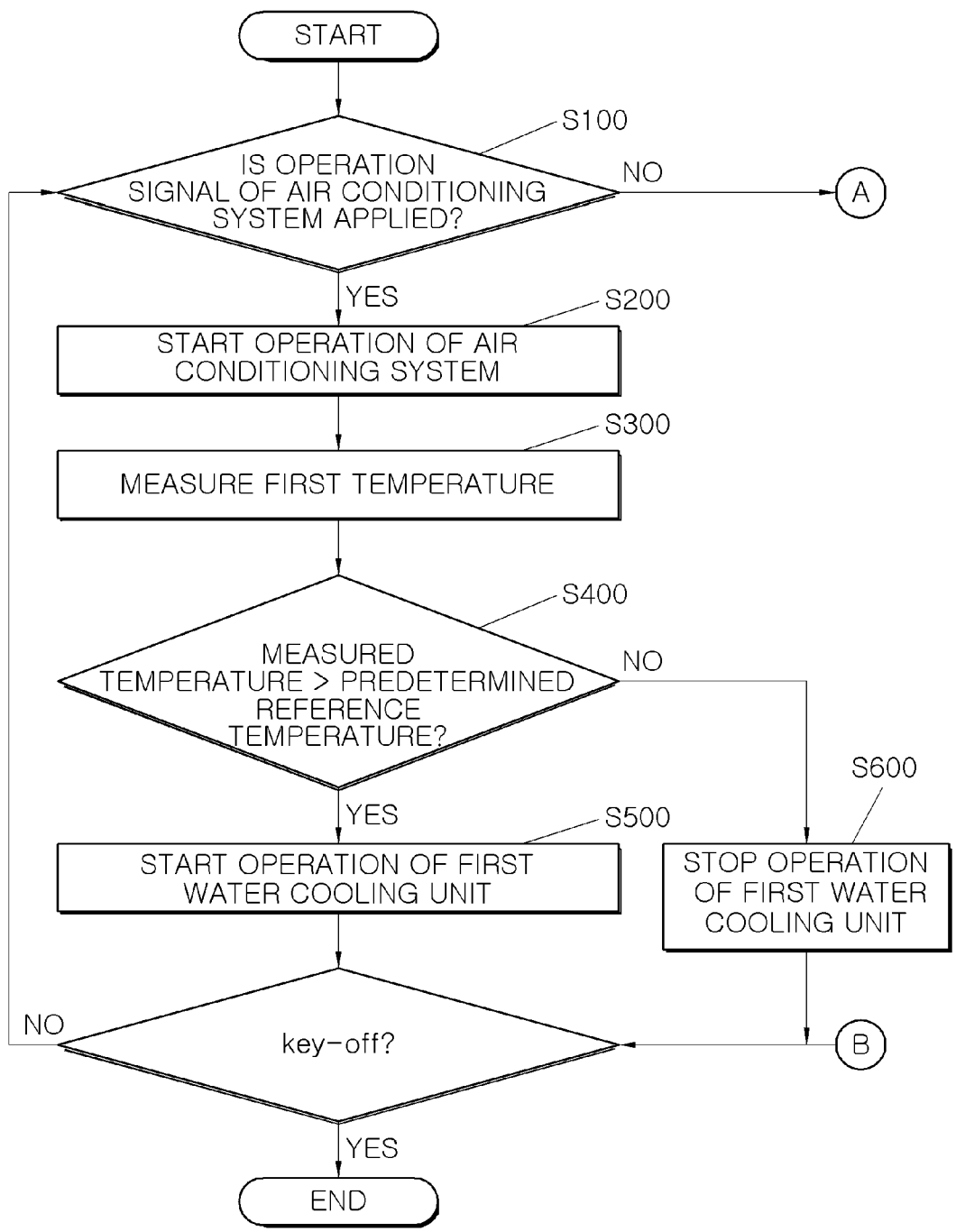
FIGS. 6A and 6B are flowcharts illustrating a method of cooling a hybrid intercooler system integrated with an air conditioning system according to another form of the present disclosure.
Figure 6B:
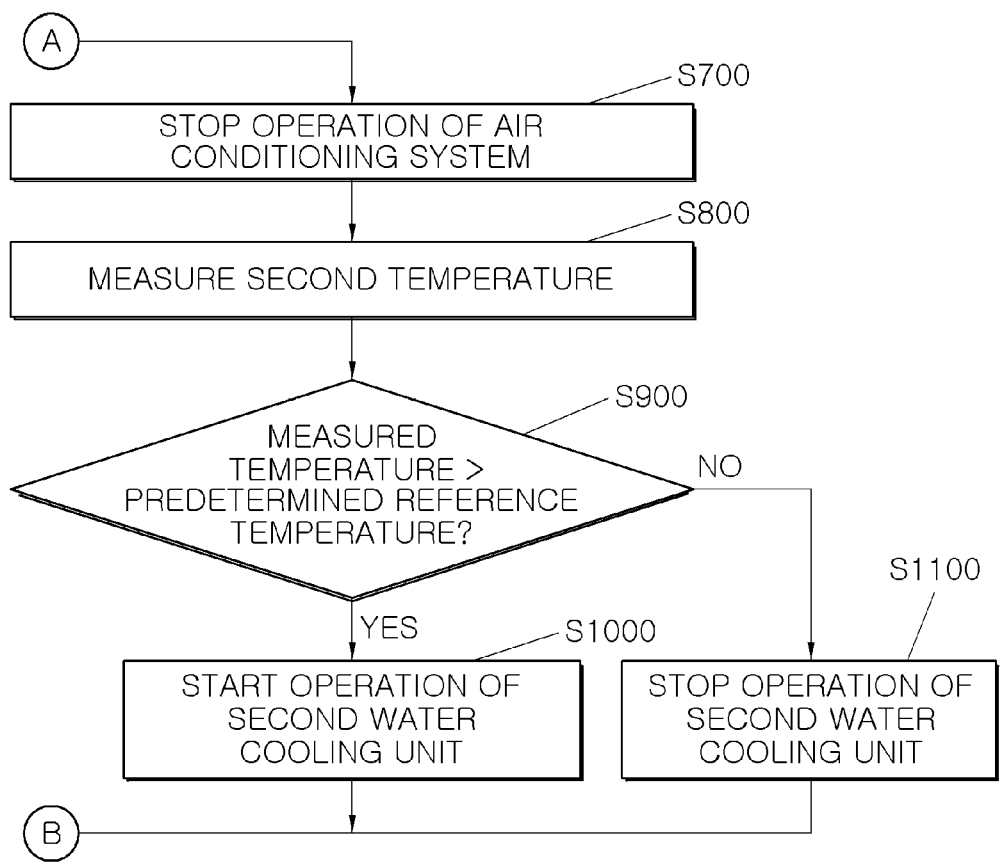

FIGS. 6A-6B are flowcharts illustrating a method of cooling a hybrid intercooler system integrated with an air conditioning system according to another form of the present disclosure. Referring to FIG. 6A, the method of cooling a hybrid intercooler system integrated with an air conditioning system according to the form of the present disclosure includes: a step of determining whether an operation signal of an air conditioning system is applied (S100), a step of starting operation of the air conditioning system if the operation signal applied (S200), a step of measuring a first temperature (S300), a step of determining whether the measured first temperature is higher than a predetermined first reference temperature (S400), a step of starting operation of a first water cooling unit when the the measured first temperature is higher than the predetermined first reference temperature (S500), a step of stopping operation of a first water cooling unit when the the measured first temperature is equal to or lower than the predetermined first reference temperature (S600).

Referring to FIG. 6B, the method of cooling a hybrid intercooler system further includes: a step of stopping operation of the air conditioning system when the operation signal of the air conditioning system is not applied (S700), a step of measuring a second temperature (S800), a step of determining whether the measured second temperature is higher than a predetermined second reference temperature (S900), a step of starting operation of a second water cooling unit when the measured second temperature is greather than the predetermined second reference temperature (S1000), and a step of stopping operation of the second water cooling unit when the measured second temperature is equal to or lower than the predetermined second reference temperature (S1100).

The step of determining an operation signal (S100) is a step of determining whether or not the operation signal of an air conditioning system is applied. The present disclosure is characterized by integrating an air conditioning system with a hybrid intercooler system. Accordingly, since the hybrid intercooler system (particularly, a water cooling unit) is controlled in consideration of the operation signal of the air conditioning system, the step of determining an operation signal (S100) is first performed.

The step of starting operation of an air conditioning system (S200) includes a step of opening first and second air conditioning valves 333 and 334 and operating a compressor 320, when the operation signal of the air conditioning system is determined to be applied. Accordingly, an expansion line 230 is opened so that a low-temperature and liquid-phase air conditioning refrigerant discharged from a receiver drier 310 is introduced into an expansion valve 360. The refrigerant is then changed to a low-temperature and gas-phase air conditioning refrigerant by expansion in the expansion valve 360, and the low-temperature and gas-phase air conditioning refrigerant exchanges heat with air in the vehicle by a heating core 370 to cool a vehicle interior. The gas-phase refrigerant, which is heat-exchanged by the heating core 370, is introduced into a compressor 320, and the heat-exchanged gas-phase refrigerant is compressed so as to be changed to a high-pressure refrigerant by the compressor 320. That is, this process is performed on the air conditioning system in order to cool the vehicle interior.

The step of measuring a first temperature (S300) is referred to as a step of measuring the temperature of compressed air at the outlet of the hybrid intercooler system integrated with an air conditioning system, after the step of starting operation of an air conditioning system (S200). In addition, the step of determining a first temperature (S400) is referred to as a step of determining whether the temperature measured in the step of measuring a first temperature (S300) exceeds a predetermined reference temperature (i.e., a predetermined first reference temperature).

Because the air (intake air) compressed by a turbocharger has a high temperature, when the compressed air is supplied to a combustion chamber as it is, the rate of increase in air density is reduced, thereby undermining charging efficiency or causing knocking. Therefore, in order to inhibit or prevent this problem, it is determined whether it is desired to further cool the refrigerant stored in a water-cooling-unit refrigerant tank 210 by using the refrigerant in the air conditioning system by comparing the temperature of compressed air at the outlet of the hybrid intercooler system with the predetermined reference temperature. In this case, the predetermined reference temperature is referred to as a temperature that deteriorates charging efficiency or causes knocking, and may be set differently according to types of vehicles or designer's intentions.

The step of starting operation of a first water cooling unit (S500) includes a step of opening first and second bypass valves 331 and 332, when the measured temperature exceeds the predetermined reference temperature (i.e., the predetermined first reference temperature). Accordingly, a bypass line 220 is opened so that the low-temperature and liquid-phase air conditioning refrigerant discharged from the receiver drier 310 is introduced into the bypass line 220. Thus, the compressed intake air, which flows in compressed intake air passages 110 surrounded by a water cooling unit 200, is cooled.

The step of stopping operation of a first water cooling unit (S600) includes a step of closing at least one of the first and second bypass valves 331 and 332, when the measured temperature is determined to be equal to or less than the predetermined first reference temperature. Accordingly, the bypass line 220 is closed so that the low-temperature and liquid-phase air conditioning refrigerant discharged from the receiver drier 310 is blocked from being introduced into the bypass line 220. As described above, the current state is a state in which the temperature of compressed intake air measured in the step of measuring a first temperature (S300) is not excessively high. In addition, it is a state in which the air conditioning system is in operation by a driver. Thus, at least one of the first and second bypass valves 331 and 332 may be closed in order to enhance the cooling performance of the vehicle interior through the evaporation of the air conditioning refrigerant in the air conditioning system.

Referring to FIG. 6B, the step of stopping operation of an air conditioning system (S700) is referred to as a step of closing the first and second air conditioning valves 333 and 334 and stopping the operation of the compressor 320, when the operation signal of the air conditioning system is determined to be not applied. Accordingly, the low-temperature and liquid-phase air conditioning refrigerant discharged from the receiver drier 310 is blocked from being introduced into the expansion valve 360. In addition, the gas-phase air conditioning refrigerant, which is heat-exchanged by the heating core 370, is blocked from being introduced into the compressor 320.

In particular, when it is unnecessary to cool the vehicle interior (when the operation of the air conditioning system is stopped by the driver), the cooling of the vehicle interior is inhibited or prevented, regardless of whether it is desired to further cool the refrigerant stored in the water-cooling-unit refrigerant tank 210 using the refrigerant in the air conditioning system.

The step of measuring a second temperature (S800) is referred to as a step of measuring the temperature of compressed air at the outlet of the hybrid intercooler system integrated with an air conditioning system, after the step of stopping operation of an air conditioning system (S700). In addition, the step of determining a second temperature (S900) is referred to as a step of determining whether the temperature measured in the step of measuring the second temperature (S800) exceeds a predetermined reference temperature (i.e., a predermined second reference temperature).

Similar to the step of measuring a first temperature (S300) and the step of determining a first temperature (S400), the air (intake air) compressed by the turbocharger has a high temperature. Accordingly, when the compressed air is supplied to the combustion chamber as it is, the rate of increase in air density is reduced, thereby causing deterioration of charging efficiency or introducing knocking. Therefore, in order to inhibit or prevent this problem, it is determined whether it is desired to further cool the refrigerant stored in the water-cooling-unit refrigerant tank 210 by using the refrigerant in the air conditioning system by comparing the second temperature of compressed air at the outlet of the hybrid intercooler system with the predetermined second reference temperature.

In this case, the predetermined second reference temperature is a temperature that causes deterioration of charging efficiency or knocking, and may be set to be a different value according to types of vehicles or designer's intentions. In addition, the predetermined second reference temperature in the step of determining the second temperature (S900) may be set to be equal to or be different from the predetermined first reference temperature in the step of determining a first temperature (S400).

The step of starting operation of a second water cooling unit (S1000) includes a step of opening the first and second bypass valves 331 and 332 and operating the compressor 320, when the measured second temperature exceeds the predetermined second reference temperature. Accordingly, the bypass line 220 is opened so that the low-temperature and liquid-phase air conditioning refrigerant discharged from the receiver drier 310 is introduced into the bypass line 220. In addition, the air conditioning system is operated to cool the compressed intake air without cooling the vehicle interior, by operating the compressor 320. Thus, the compressed intake air, which flows in the compressed intake air passages 110 surrounded by the water cooling unit 200, is cooled.

The step of stopping operation of a second water cooling unit (S1100) includes a step of closing at least one of the first and second bypass valves 331 and 332 and maintaining the stopped state of the operation of the compressor 320, when the measured second temperature is determined to be equal to or less than the predetermined second reference temperature. Accordingly, the bypass line 220 is closed so that the low-temperature and liquid-phase air conditioning refrigerant discharged from the receiver drier 310 is blocked from being introduced into the bypass line 220.

As described above, the current state is a state in which the temperature of compressed intake air measured in the step of measuring a second temperature (S800) is not excessively high. In addition, it is a state in which the operation of the air conditioning system is stopped by the driver. Thus, since it is unnecessary to operate the air conditioning system, at least one of the first and second bypass valves 331 and 332 is closed and the stopped state of the operation of the compressor 320 is maintained, in order to inhibit or prevent deterioration of fuel efficiency due to the operation of the air conditioning system.

In accordance with the exemplary forms of the present disclosure, it is possible to stabilize the temperature of intake air passing through the inlet of an intercooler using a water cooling unit and increase the cooling efficiency of the intercooler using an air cooling unit. Consequently, it is possible to improve engine power and fuel efficiency.

In addition, it is possible to inhibit or prevent an increase in weight and cost by cooling a water-cooled intercooler using an air conditioning system without a separate cooling line for cooling the water cooling unit.

In addition, it is possible to reduce knocking of an engine by stably maintaining intake air temperature in the combustion chamber of the engine.

In addition, since the opening portion of a bumper may be reduced by an increase in cooling efficiency of the intercooler, it is possible to reduce air resistance to thereby improve fuel efficiency, and to increase a degree of freedom in design.

While the present disclosure has been described with respect to the specific forms, it will be apparent to those skilled in the art that various changes and modifications may be made without departing from the spirit and scope of the present disclosure.

What is claimed is:

1. A method of controlling a hybrid intercooler system integrated with an air conditioning system, the method comprising:
   determining whether or not an operation signal of the air conditioning system is applied;
   starting operation of the air conditioning system by opening first and second air conditioning valves and operating a compressor, when the operation signal of the air conditioning system is determined to be applied;
   measuring a first temperature by measuring a temperature of compressed air at an outlet of the hybrid intercooler system integrated with the air conditioning system, after the starting operation of the air conditioning system;
   determining whether the measured first temperature exceeds a predetermined first reference temperature; and
   in response to determining that the measured first temperature exceeds the predetermined first reference temperature, starting operation of a water cooling unit by opening first and second bypass valves respectively disposed on a bypass line branched from a receiver drier of the air conditioning system, wherein the bypass line is open or closed by controlling the first and second bypass valves mounted on the bypass line, respectively, at locations upstream and downstream of a water-cooling unit refrigerant tank of the water cooling unit.

2. The method of claim 1, further comprising stopping the operation of the water cooling unit by closing at least one of the first or second bypass valves, when the measured first temperature is determined to be equal to or less than the predetermined first reference temperature.

3. The method of claim 1, further comprising stopping the operation of the air conditioning system by closing the first and second air conditioning valves and stopping the operation of the compressor, when the operation signal of the air conditioning system is determined to be not applied.

4. The method of claim 3, further comprising measuring a second temperature by measuring a temperature of compressed air at the outlet of the hybrid intercooler system integrated with the air conditioning system, after the stopping the operation of the air conditioning system.

5. The method of claim 4, further comprising determining whether the measured second temperature exceeds a predetermined second reference temperature.

6. The method of claim 5, further comprising starting operation of the water cooling unit by opening the first and second bypass valves and operating the compressor, when the measured second temperature exceeds the predetermined second reference temperature.

7. The method of claim 5, further comprising stopping operation of the water cooling unit by closing at least one of the first or second bypass valves and maintaining the stopped operation of the compressor, when the measured second temperature is determined to be equal to or less than the predetermined second reference temperature.

\* \* \* \* \*